Figure 1:
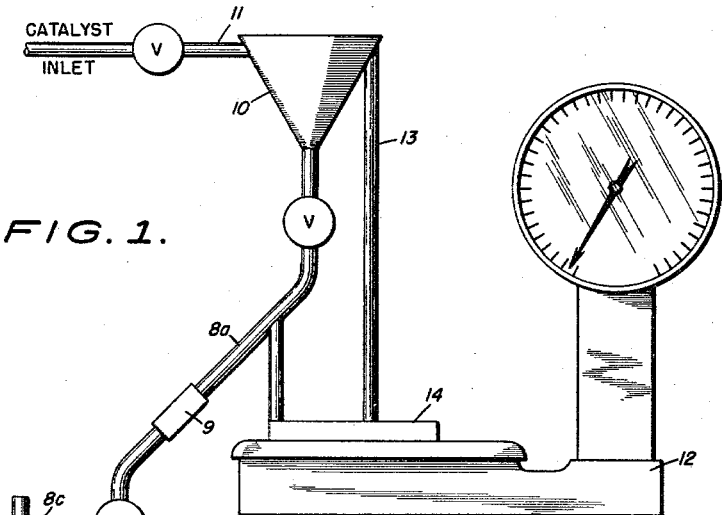

July 20, 1965   C. D. HELM ETAL   3,195,776
AUTOMATIC CATALYST DISPENSER
Filed Dec. 3, 1962   4 Sheets-Sheet 1

CHARLES D. HELM
CHARLES B. BAYLES
INVENTORS

BY *Ann G. Leibowitz*
AGENT

July 20, 1965 C. D. HELM ETAL 3,195,776
AUTOMATIC CATALYST DISPENSER
Filed Dec. 3, 1962 4 Sheets-Sheet 2

CHARLES D. HELM
CHARLES B. BAYLES
INVENTORS

BY *Ann G. Leibowitz*
AGENT

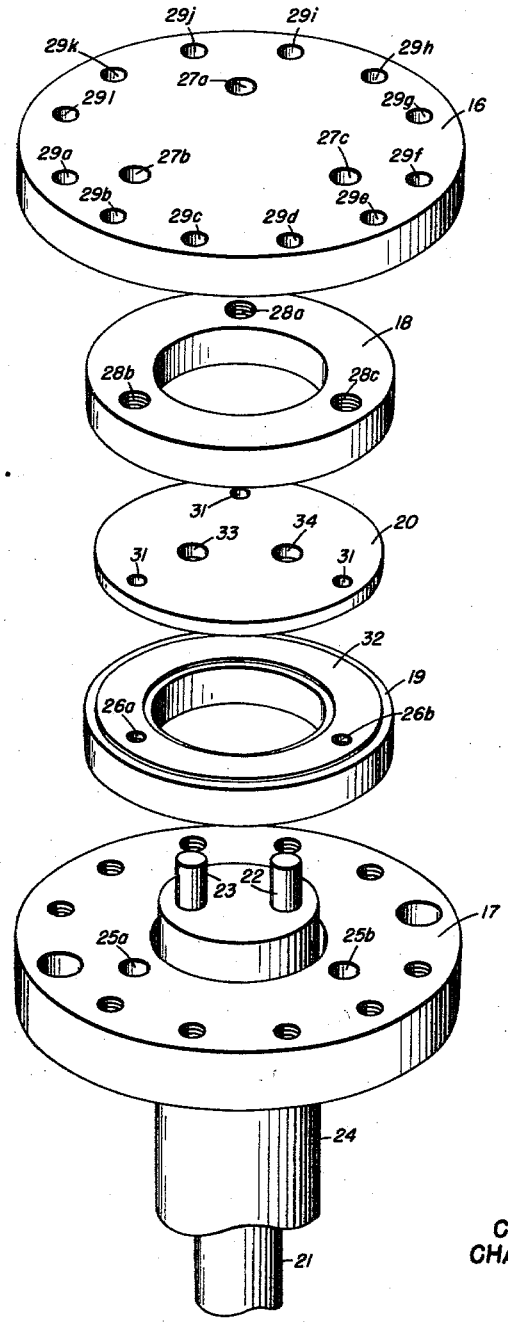

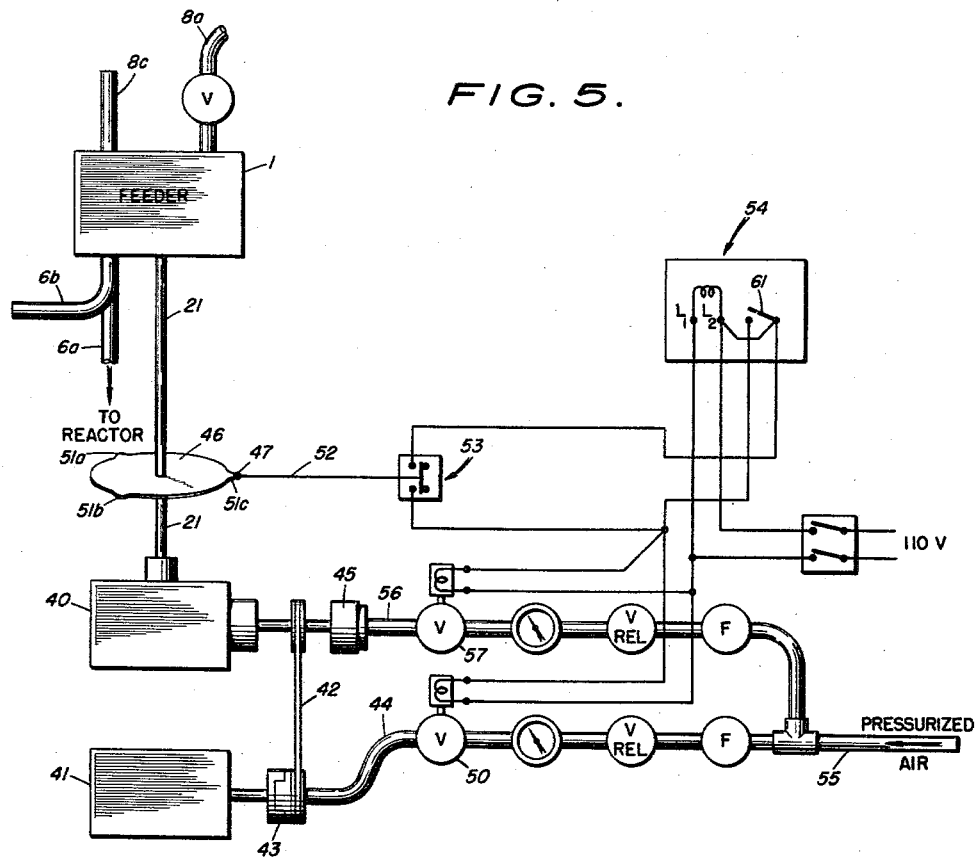

3,195,776
AUTOMATIC CATALYST DISPENSER
Charles D. Helm, Annapolis, and Charles B. Bayles, Severna Park, Md., assignors to W. R. Grace & Co., New York, N.Y., a corporation of Connecticut
Filed Dec. 3, 1962, Ser. No. 241,718
14 Claims. (Cl. 222—63)

This invention relates to a device for feeding particulate solids, slurries or pastes, and also to means for controlling the operation of the device. In a specific aspect the invention relates to a device for continuously feeding measured, controllable quantities of solid particulate catalyst or slurries or pastes containing the same into a polymerization reactor, thus permitting continuous operation of the reactor. A very desirable feature of the device is that it is capable of feeding catalyst to polymerization reactors operating at pressures well above atmospheric, e.g., up to 500–600 pounds per square inch or more.

Devices for feeding solid particulate materials at closely controlled rates are necessary or desired in a wide variety of processes. A typical example of such processes are the so-called "low pressure" processes for catalytic polymerization of 1-olefins to form high molecular weight solid polymers such as polyethylene, polypropylene or the like, such as described, for example, in Belgian Patents 533,362; 534,792; 534,888; and 540,459 (all to Karl Ziegler) and in Hogan et al., U.S. Patent 2,825,721 (March 4, 1958). The catalysts used in the described processes include such particulate solid materials as $TiCl_3$, $TiCl_2$, chromium oxide on a silica-alumina support, etc. The catalysts are introduced into the polymerization reactors in the particulate solid state or as slurries or pastes in inert fluids. Since the reactors almost always operate under pressures well above atmospheric, a serious problem is encountered when attempts are made to feed catalyst to the reactor continuously. It has been particularly difficult to find means for continuously feeding measured, controlled amounts of catalyst to the high pressure reaction zones for any practical length of time.

It is an object of this invention to provide a device for solving the abovenoted prior art problems. A further and specific object of the invention is to provide a device for continuously feeding controlled measured amounts of solid particulate catalyst to an olefin polymerization reactor. Another object of the invention is to provide specific means for accurately controlling the operation of the feed device. Other objects will become apparent to those skilled in the art in view of the following more detailed description.

The feeding device of this invention comprises a rotatable disc having at least one recess bored therethrough. The disc is held between a top and bottom flange and top and bottom annular rings between the disc and the respective flanges. The top flange and ring each have two or three aligned passageways therethrough, while the bottom flange and ring each have one or two aligned passageways that are aligned with passageways in the upper flange and ring. Usually an annular gasket is placed between the disc and each of the upper and lower rings, each such gasket also having passageways therethrough corresponding in position and in number to the passageways in the respective ring. Means are provided to apply compressive pressure between the flanges and the disc recesses are located so as to communicate with the passageways in the respective flanges, rings and gaskets as the disc is rotated.

The invention will be readily understood after a consideration of the accompanying drawings in which a preferred embodiment of the invention is illustrated and wherein—

Figure 2:
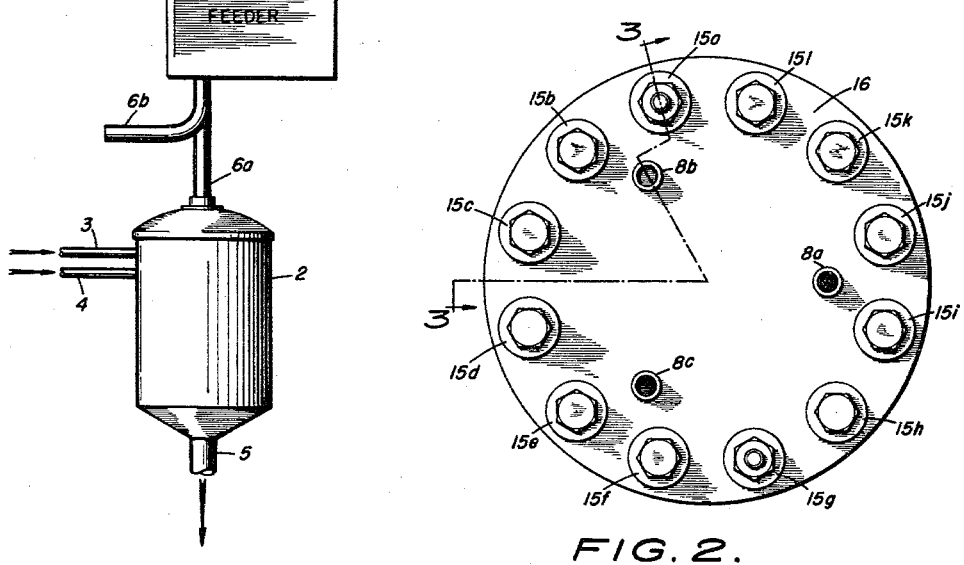
Figure 3:
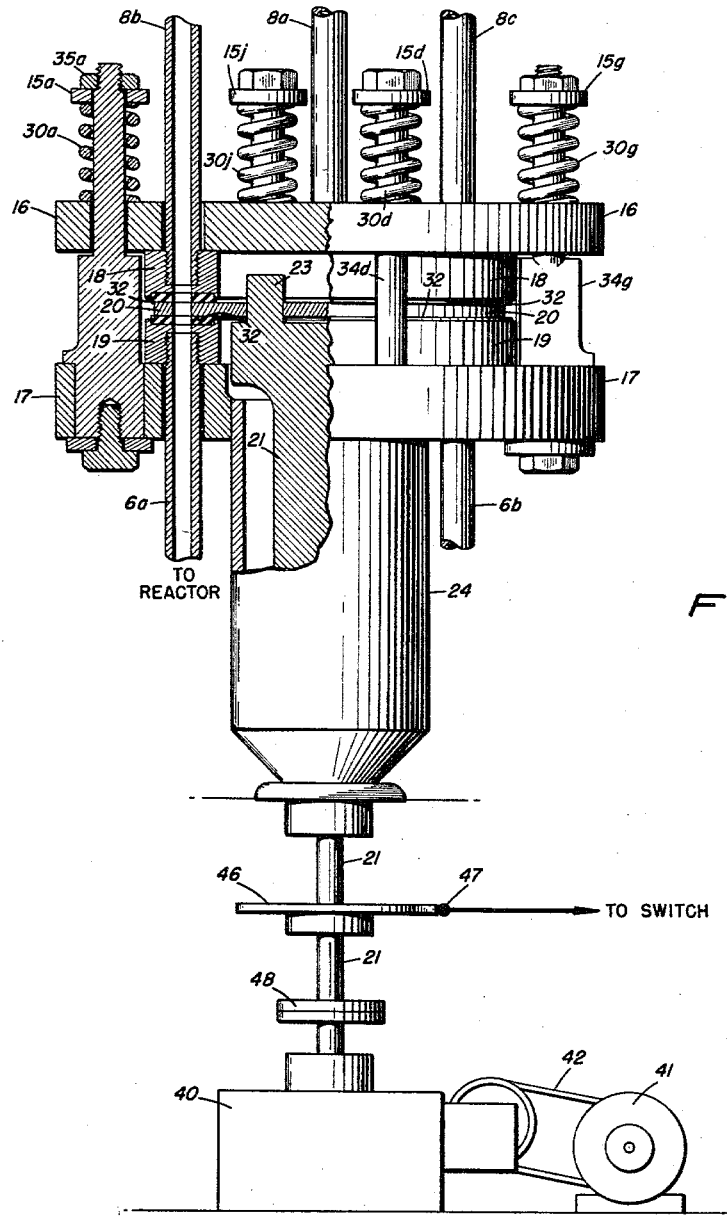

FIGURE 1 is a schematic elevation view of one arrangement of apparatus in accordance with the invention, FIGURE 2 is a partial plan view of the apparatus shown in FIGURE 1, FIGURE 3 is a detailed front elevational view (in partial cross-section) of the preferred feeding device, taken on line 3—3 of FIGURE 2 (with some elements omitted for better clarity) and a schematic illustration of some of the associated motivating apparatus, FIGURE 4 is an isometric detailed blow-up view showing the basic elements of the preferred feeding device, and FIGURE 5 is a schematic illustration of means for controlling operation of the feeding device.

The same or like elements of the apparatus have the same reference numerals in all of the various figures.

In FIGURE 1, a polymerization reactor 2 having a monomer feed inlet line 3, a product outlet line 5 and a feed line 6a for solid particulate catalyst is shown. Other feed lines, e.g., line 4, can be provided for introducting other necessary materials such as catalyst activators, reaction diluents, inert gases (for purging or blanketing purposes), etc. as needed or desired for the particular polymerization reaction. Catalyst feed line 6a communicates with the feeding device 1, shown schematically in FIGURE 1. Catalyst is introduced to the feeding device through valved conduit 8a which communicates with catalyst storage vessel 10. Ordinarily a section 9 of the conduit 8a is made of a resilient, flexible material such as plastic or rubber, to facilitate connection and disconnection of the feeder and storage vessel. In a preferred embodiment the storage vessel is mounted on a stand having a base 14 and a stanchion 13; and the stand is in turn placed on a suitable scale 12 so that a rapid indication of amounts of catalyst fed, and the weight of solid particulate catalyst remaining in the storage vessel can be obtained. The storage vessel is provided with valved line 11 for refilling when desired or necessary. FIGURE 2 shows that the feeder is provided with a plurality (three are shown) of inlet conduits 8a, 8b, and 8c, preferably spaced equiangularly about the top, for purposes to be subsequently described. The function of the plurality (twelve are shown) of retaining washers 15a, 15b, 15c, etc. shown in FIGURE 2 will also be described below.

Turning now to FIGURES 3 and 4 it is seen that the feeder is constructed from fixed top and bottom flanges 16 and 17, respectively; fixed top and bottom port rings 18 and 19, respectively; and a rotating disc 20. The particular means for rotating the disc in the illustrated feeder is a drive shaft 21, having a pair of drive pins 22 and 23. A housing 24 is also provided for the drive shaft. The bottom flange and bottom port ring each have a pair of matched passages 25a, 25b, and 26a, 26b, respectively, bored therethrough. The top flange and top port ring each have a trio of matched passageways 27a, 27b, 27c and 28a, 28b, 28c, respectively, bored therethrough. As readily seen in FIGURE 3 these passageways are adapted to receive inlet conduits 8a, 8b and 8c at the top, and outlet conduits 6a and 6b at the bottom. In the illustrated feeder three recesses 31 are drilled through rotating disc 20. Drive pin holes 33 and 34 are also provided in the disc to receive drive pins 22 and 23. The use of drive pins to rotate disc 20 permits a flexible coupling between the drive shaft and the disc and also permits slight angular and/or vertical movement of the disc with respect to the longitudinal axis of the drive shaft. It will be obvious that a single drive pin of suitable cross section, e.g., square or hexagonal, and corresponding single drive pin hole could be used. Preferably the passageways and conduits in the flanges and port rings are threaded and gasket rings 32 (made from resilient low friction materials such as polytetrafluoroethylene) are placed between the rotating disc 20 and each of the top and bottom port rings so as to provide fluid tight communication through the feeder from, e.g., feed conduit 8b to the corresponding outlet conduit 6a via passageways 27b, 28b, 31b, 26a and 25a. The flanges also have a plurality of holes (eg., the holes 29a, 29b, 29c, etc. in top flange 16) about their outer perimeter in the portions which extend radially beyond the outer edge of disc 20. As most readily seen in FIGURE 3 bolts are passed through these holes. In FIGURE 3 only 4 of the 12 bolts are shown. Compression springs 30a, 30b, etc. are retained about the top flange by nuts and retaining washers (e.g., 35a and 15a, respectively) or other equivalent means to compress flanges 16 and 17 together. Usually at least two of the bolts (e.g., 34a and 34g) are torque bolts, strong enough to prevent rotation of the top flange 16 relative to the drive shaft housing 24. The remaining bolts (e.g., 34d) can be ordinary shoulder bolts threadely engaged into flange 17 or other equivalent means.

Means for actuating the feeding device are schematically shown in FIGURES 3 and 5. As there shown drive shaft 21 is connected through a suitable coupling 48 to the output drive of speed reducer 40. The speed reducer is in turn operatively connected as, e.g., through drive belt 42 to motor 41. A disc cam 46 is mounted on drive shaft 21 to rotate simultaneously therewith.

As most readily seen in FIGURE 5, the cam has a plurality of lobes 51a, 51b, etc. on its outer periphery which periodically come into contact with contact element 47 which is operatively connected by rod 52 to a precision-type limit switch 53. The control apparatus of FIGURE 5 also includes a timer 54, air lines 55, 44, and 56, an air operated brake 45 for the input to speed reducer 40, an air operated clutch 43 for the motor 41, three-way solenoid valves 57 and 50 in the air lines 56 and 44, respectively, gauges G, pressure regulating valves V and filters F in the respective air lines, and a source of electric power for the switch and timer, and suitable electrical leads between the electrically actuated elements. The timer could be mechanically actuated, if desired.

The method of operating the feeder is readily apparent from the above description. Briefly summarized, the method comprises introducing solid particulate catalyst through conduit 8a, passageways 27a and 28a into one of the recesses 31 of the rotating disc. In the embodiment shown, after the disc rotates through an angular distance of 120° the catalyst-filled recess 31 will communicate with passageways 26a and 28b. An inert flushing fluid (e.g., gaseous nitrogen, argon or helium; a liquid paraffin such as n-hexane; or a gas or liquid stream of the monomer to be polymerized) under pressure is fed through conduit 8b. The flushing fluid will pick up catalyst in the recess and carry it through passageways 26a, 25a and through conduit 6a to the reactor. At the same time another recess in the rotating disc is being filled through conduit 8a. When the disc again rotates through angular distance of 120°, catalyst in the second filled recess is carried to the reactor as described above. Simultaneously, the first recess communicates with passageways 27c, 28c, 26b and 25b. An inert purging fluid (such as gaseous nitrogen, argon, helium, etc.) is fed under pressure through conduit 8c and purges any residual catalyst and/or flushing fluid remaining in the first recess. This purging operation precludes any polymerization in and resultant plugging of the recesses when olefin monomer is used as the flushing fluid. Continuous repetition of the above steps as the rotating disc passes into communication with the respective passageways and conduits associated therewith, permits continuous, closely controlled feed of particulate solid to the desired location, e.g., a polymerization reactor.

The following is a description of the operation of the control apparatus schematically shown in FIGURE 5. A continuously running motor 41 is operatively connected to speed reducer 40 by any suitable means; for example a drive belt 42. The speed reducer operates only when air-operated clutch 43 is engaged and air-operated brake 45 is disengaged. The clutch and brake are engaged and disengaged by pressurized air in line 55 and lines 44 and 56, respectively. The air lines 44 and 56 are controlled by three-way solenoid valves 50 and 57 respectively. Air operation of the clutch and brake greatly decreases the possibility of fire or explosion hazards in processes where such hazards exist.

The output power from speed reducer 40 is delivered to drive shaft 21 which in turn rotates disc 7 in the feeder 1. Fixedly engaged to the drive shaft is a suitable indexing means such as cam 46 having a plurality of lobes 51a, 51b, 51c, etc. As contact element 47 periodically moves across the lobes 51, rod 52 (connected to the element) opens and closes precision-type limit switch 53. An electrically operated timer 54 determines the frequency at which the drive shaft 21 is energized. The "on" and "off" periods of the timer can be varied to suit any particular need. The "off" period determines the time between movements of the power output of the speed reducer and consequently the movements of the drive shaft and the rotating disc in the feeder 1. The "on" period of the timer is set to energize the three-way solenoid valves 57 and 50, until the limit switch (operated by the cam 46 and contact element 47, and connecting rod 52) is in the closed position. The air brake 45 prevents coasting of the input shaft of the speed reducer 40 after the index point has been reached, i.e., after one of the cam lobes has opened switch 53.

A typical cycle is described below:

The drive motor and the timer are in operation with air supply to the solenoid valves. To start the cycle, the timer closes switch 61 which energizes both solenoid valves allowing air to apply the clutch and venting air from the brake to release the brake. The motor then drives the speed reducer, turning the cam and the rotatable disc of the cavity feeder. When the cam has moved about 20 degrees the contacts on the precision-type limit switch 53 are closed, completing a circuit parallel to the switch on the timer. Shortly afterward the timer opens the switch 61 so that only the limit switch controls electric power to the solenoid valves. After the cam and ported disc have moved 120°, a lobe on the cam moves the precision-type limit switch to the open position to de-energize the solenoid valves. The valve in the air line to the clutch is vented to the atmosphere. Simultaneously, the vent in the valve of line 56 (to the brake) is closed and air from the solenoid is applied to the brake bringing the input shaft of the speed reducer to a halt.

The operation described above is repeated each time the ported disc is indexed. The cycle is repeated after the timer has gone through an "off" period determined by the setting of the timer. The speed of indexing determines the rate of feed of catalyst to the system.

The invention is illustrated, but not limited, by the following specific examples.

EXAMPLE 1

In this example, propylene was polymerized at a temperature of about 150° Fahrenheit and a pressure of about 425 pounds per square inch, gauge without the use of a separate inert diluent or solvent.

Liquid propylene was continuously fed to the reactor at a rate of 150 pounds per hour. A feeder for solid particulate $TiCl_3$, constructed as shown in detail in FIGURES 2 and 3, was mounted above the reactor. The rotating disc 20 of the feeder was 9/16 inch thick and had three equally spaced recesses bored therethrough, each 3/8 inch in diameter. $TiCl_3$ catalyst was continuously fed to the reactor at a rate of 20 grams per hour, using liquid propylene as the flushing fluid in conduits 8b and 6a to carry the solids from the feeder to the reactor, and gaseous nitrogen in conduits 6b and 8c as a purging gas. Diethyl aluminum chloride was separately added to the reactor as a solution in n-hexane and in amounts sufficient to maintain a 4 to 1 mole ratio of diethylaluminum chloride to titanium trichloride.

A slurry of polypropylene in liquid propylene was discharged from the reactor at a rate of 150 pounds per hour. The solids content of the slurry ranged from 16 to 27% by weight. Solid polymer was recovered from the slurry at rates of about 25 to about 40 pounds per hour. The polymerization system was satisfactorily operated on a fully continuous basis for about 12 hours.

EXAMPLE 2

The rotating disc feeder described in Example 1 was used in other polypropylene production runs similar to that described in the example. In each instance the feeder was used to introduce solid, particulate titanium trichloride (TiCl₃) to the reactor. Performance data is shown in the following table.

*Table I*

PERFORMANCE OF ROTATING DISC FEEDER

| Reactor Pressure (pounds per square inch gauge) | Recess Fills per Hour | TiCl₃ feed rate (grams per hour) |
|---|---|---|
| 450 | 160 | 40.6 |
| 450 | 200 | 66 |
| 500 | 80 | 38 |

In other runs under similar conditions some plugging occurred in the feeder as a result of propylene polymerizing in the recesses of the rotating disc. The particular construction of the feeder disclosed herein permitted easy and rapid dismantling, cleaning and reassembly.

Certain modifications of the invention not described above will be apparent to those skilled in the art. For example, it is obvious that the flanges and annular rings of the feeder (which are disclosed as separate elements) could be unitary machined pieces or could be welded together to form unitary flanged annular rings for assembly above and below the rotatable disc. In like manner, the plural compression springs and associated bolts could be replaced by other equivalent devices. The illustrative embodiment and operative examples should not be construed as imposing any limitations on the invention, other than those defined in the appended claims.

What is claimed is:

1. Device of the class described comprising a rotatable disc having at least one recess bored therethrough, a fixed flange above said disc having at least 2 but not more than 3 passageways therethrough, a fixed flange below said disc having at least one but not more than 2 passageways therethrough each aligned with passageways in the upper flange, a pair of fixed annular rings, one above and one below said disc each lying between said disc and said respective flanges and having passageways therethrough corresponding in number and in position to the passageways in the respective flanges, an annular gasket between said disc and each of said rings to provide sealed relationship therebetween, each of gaskets having passageways therethrough equal in number and in position to the passageways in the ring with which they are associated, and means for applying compressive pressure between said flanges, said recesses being located in disc so as to communicate with said passageways when the disc is rotated, a drive shaft extending through said bottom flange to rotate said disc, said drive shaft being actuated by the power output of a speed reducer which speed reducer is in turn actuated by a motor detachably connected with the power input to said speed reducer; said motor having an air-operated clutch permitting disconnection between said motor and said speed reducer power input; said power input having an air operated brake preventing rotation of said input when said clutch is open, control means comprising a cam fixedly attached to said drive shaft between said speed reducer and said bottom flange; a precision-type limit switch which can be alternately opened and closed as said cam rotates with the drive shaft, and a timer operatively connected to said switch and to a solenoid valve in each of the air lines leading to said air operated brake and air operated clutch; and wherein means are provided for actuating said timer.

2. A multiposition dispensing device comprising a rotatable disc having at least one passageway therethrough, a stationary flange above said disc having at least two passageways therethrough, each passageway being aligned with passageways in the rotatable disc, a stationary flange below said disc having at least one passageway therethrough aligned with the passageways in the rotatable disc and upper flange and having at least one less passageway therethrough than the rotatable disc, annular gaskets between said disc and each of said flanges to provide a sealed relationship therebetween, each of said gaskets having passageways therethrough equal in number and aligned with respect to the passageways in the element with which they are associated, and automatically controlled drive means connected to said disc for rotating said disc around its axis and thereby aligning the passageways therethrough consecutively with respect to at least one passageway in the upper flange, and for stopping the disc rotation in the aligned position for a predetermined time.

3. A device as described in claim 2 comprising resilient compression means which are evenly spaced around the flanges and at substantially equal radial distances from the axis of the rotatable disc for urging one flange toward the other flange whereby the flanges, gaskets, and rotatable disc are held together in a sealed, unitary structure.

4. A device as described in claim 2 wherein the flanges extend in a radial direction beyond the rotatable disc and are urged together under pressure by means of resilient compression means connected to the extended flange portions.

5. Device for controlling rotation of a drive shaft comprising in combination a speed reducer with power output shaft connected to said drive shaft, an air operated brake on the power input shaft to said reducer, a motor with means for connecting said motor with the power input shaft of said speed reducer, and an air operated clutch permitting disconnection of said motor from said speed reducer input shaft and whereby said brake may be made operative when the clutch is open and inoperative when the clutch is engaged, a cam fixedly attached to said drive shaft; a precision-type limit switch actuated by rotation of said cam; a timer connected to said switch and to a pair of three way solenoid valves, one of each in the respective air feed lines to said air-operated clutch and brake; and means for actuating said timer.

6. A device for controlling rotation of a drive shaft comprising in combination a drive shaft, a power input means connected to said drive shaft, a motor means connected to said power input means for driving the power input means, a brake means connected to said power input means for stopping the rotation of said power input means, control means connected to said clutch means and brake means for engaging said brake when said clutch is released and for releasing said brake when said clutch is released, said control means comprising a switch means connected to said clutch means and brake means, a position indicating means attached to said drive shaft for indicating the position to which the shaft has rotated at any time, a switch means operatively connected to and responsive to said position indicating means and connected to said brake means and clutch means for operating said clutch means and brake means in response to the angular position of the drive shaft as indicated by said position indicating means.

7. The device as described in claim 6 wherein the brake means and clutch means are fluid pressure operated.

8. A device as described in claim 6 wherein the control means comprises, in addition, three way solenoid valves responsively connected to said switch means, to a source of air under pressure, and to said air operated clutch means and brake means whereby air is released to operate said clutch means and brake means in response to the angular position of said drive shaft.

9. A device as described in claim 6 wherein the position indicating means is a cam fixedly attached to said drive shaft.

10. A device as described in claim 6 wherein the switch means comprises a limit switch responsively connected to said position indicating means and operatively connected to said brake means and clutch means.

11. A device as described in claim 10 wherein the control means in addition comprises a timer means connected to said switch means for controlling the period of time at which the drive shaft is allowed to remain stationary and connected to said brake means and clutch means for operation of same.

12. A multiposition dispensing device comprising a rotatable disc having at least one passageway therethrough, a stationary flange above said disc having at least two passageways therethrough, a stationary flange below said disc having at least one passageway therethrough and at least one less passageway than the rotating disc, the passageways in the upper flange, rotating disc and lower flange being mutually aligned, gasket means between the rotatable disc and each of said flanges with passageways therethrough corresponding in number and aligned with respect to the element with which they are associated, drive means connected to said rotatable disc, motor means connected to said drive means by a clutch means, brake means connected to said drive means for stopping the motion thereof, control means operatively connected to said clutch means for simultaneously releasing the brake means and engaging the clutch means for rotation of said disc from a position wherein a passageway in the lower flange is aligned with respect to a passageway in the rotatable disc and for engaging the brake means and simultaneously releasing the clutch means in response to the subsequent alignment of a passageway in the lower flange with respect to another, consecutive passageway in the rotatable disc.

13. A device of the class described comprising a multiposition rotary feed dispenser connected to a drive shaft, a brake means on the drive shaft, a motor connected to the drive shaft through a clutch means, and control means operatively connected to said brake means and clutch means for releasing the brake means and engaging the clutch means for rotating the feed dispenser from one position for dispensing to a second position for dispensing and for releasing the clutch means and engaging the brake means to stop the rotation of the feed dispenser in response to the rotation of the feed dispenser to the second position.

14. A multiposition catalyst dispensing device comprising a rotatable disc having at least three passageways therethrough, a stationary flange above said disc having at least a catalyst feed passageway, a flushing fluid passageway, and a purging fluid passageway therethrough, each passageway being aligned with passageways in the rotatable disc when in one position, a stationary flange below said disc having at least a flushing fluid passageway for receipt and delivery of catalyst from the rotatable disc when in said position and a purging fluid passageway for separate delivery aligned with the respective passageway in the upper flange and having at least one less passageway therethrough than the rotatable disc, annular gaskets between said disc and each of said flanges to provide a sealed relationship therebetween, each of said gaskets having passageways therethrough equal in number and aligned with respect to the passageways in the element with which they are associated.

References Cited by the Examiner

UNITED STATES PATENTS

| | | | |
|---|---|---|---|
| 2,299,565 | 10/42 | Colburn | 222—270 X |
| 2,314,031 | 3/43 | Colburn | 222—370 X |
| 2,399,016 | 4/46 | Gits | 222—231 |
| 2,417,700 | 3/47 | McCarty | 222—370 X |
| 2,550,781 | 5/51 | Colburn | 222—370 X |
| 2,643,093 | 6/53 | Province. | |
| 3,039,576 | 6/62 | Stilley. | |

OTHER REFERENCES

Bulletin B4A of the Chicago Gasket Co. (1952), 3 pgs.

LOUIS J. DEMBO, *Primary Examiner*.